United States Patent [19]

Cheng

[11] 4,224,509

[45] Sep. 23, 1980

[54] HOLOGRAPHIC SCANNING SYSTEM

[75] Inventor: Charles C. K. Cheng, Pittsford, N.Y.

[73] Assignee: NCR Corporation, Dayton, Ohio

[21] Appl. No.: 953,155

[22] Filed: Oct. 19, 1978

[51] Int. Cl.² .................. G06K 7/10; G02B 27/17
[52] U.S. Cl. .................... 235/457; 235/467; 350/3.71
[58] Field of Search .............. 235/383, 457, 462, 431, 235/432, 463, 466, 467; 364/404, 405; 350/3.71; 250/566

[56] References Cited

U.S. PATENT DOCUMENTS

| | | | |
|---|---|---|---|
| 3,619,033 | 11/1971 | McMahon | 350/3.71 |
| 3,677,622 | 7/1972 | Nishida | 350/3.71 |
| 3,814,904 | 6/1974 | Russell | 235/487 |
| 3,818,444 | 6/1974 | Connell | 235/467 |
| 3,916,158 | 10/1975 | Sansone | 235/467 |
| 3,988,573 | 10/1976 | Hayosh | 235/467 |
| 4,006,343 | 2/1977 | Izura | 235/467 |
| 4,041,322 | 8/1977 | Hayosh | 235/467 |
| 4,113,343 | 9/1978 | Pole | 350/3.71 |

OTHER PUBLICATIONS

Pole & Wollenmann–"Holographic Laser Beam Deflector", Applied Optics, vol. 14, No. 4, Apr. 1975.
Sakurai et al–"Laser Scanner and its Application"–Conference: Ocean IEEE Intl. Conf. on Engineering in Ocean, Seattle, Wash., Sep. 25-28, 1973.
Beiser–"Laser Beam Information Scanning and Recording"–Annals of New York Academy of Sciences, vol. 267, pp. 384-410, 1976.

Primary Examiner—Robert M. Kilgore
Attorney, Agent, or Firm—J. T. Cavender; Wilbert Hawk, Jr.; Richard W. Lavin

[57] ABSTRACT

A holographic scanning system for scanning a bar code indicia is disclosed in which the light beam of a laser is split into two segments, each directed through a plurality of holograms mounted on a single rotating disk for generating a scanning pattern comprising a plurality of intersecting lines on a target area through which passes a label or object bearing a bar code indicia. The light reflected from the bar code indicia is picked up by an optical detector for use in reading the bar code. A second embodiment includes a rotating disk having mounted thereon two holograms each offset to the other which generates a semicircular scan pattern used in generating an X scan pattern on the target area.

13 Claims, 13 Drawing Figures

HOLOGRAPHIC SCANNING SYSTEM

BACKGROUND OF THE INVENTION

In present day merchandising point-of-sale operations, data pertaining to the merchandised item purchased is obtained by reading data encoded indicia such as a bar code printed on the merchandised item. In order to standardize the bar codes used in various point-of-sale readout systems, the grocery industry has adopted a universal product code (UPC) which is in the form of a bar code. Various reader systems have been constructed to read this bar code including hand-held wands which are moved across the bar code and stationary optical reader systems normally located within the check-out counter and in which the merchandise item purchased is moved across a window constituting the scanning area of the counter, which movement is a part of the process of loading the item in a baggage cart.

The stationary scanning systems presently available utilize a rotating mirror for generating a scan pattern used in reading the bar code. Examples of this type of scanning system are found in U.S. Pat. Nos. 3,916,158, 3,995,166 and 4,057,784. Limitations of this type of scanner structure include tight mechanical requirements to provide the required registry of the scan pattern on the target area, which requirement limits the operating efficiency of such scanning apparatuses. In addition, this type of scanning apparatus by necessity is large in size and weight and therefore high in cost. It is therefore an object of this invention to provide an improved scanning apparatus for projecting a multiple-line scan pattern in a bar code reader apparatus. It is a further object of this invention to provide a scanning apparatus which has few operating parts and therefore is low in cost but yet highly reliable. It is still another object of this invention to provide an improved scanning apparatus which generates a multiple-line scan pattern which provides a high rate of good readings of bar code indicia not orientated in a position perpendicular to the scanning beam.

SUMMARY OF THE INVENTION

In order to fulfill these objects, a scanning apparatus is provided which comprises optical means for directing multiple beams of a laser through a plurality of holograms mounted on a rotating disk, each hologram projecting the laser beam along a predetermined path across a scan area located in the path of movement of a bar code indicia. Each of the multiple beams is offset 90° to allow each hologram to orient the beam in both a first and second direction when rotated 90° resulting in the forming of a grid pattern on the scanning area. A second embodiment is disclosed in which a single beam of a laser is transmitted through a rotating disk on which is mounted two offset holograms which produce a semi-circular beam scan pattern producing an X scan pattern on the scanning area after being orientated by a pair of mirrors.

BRIEF DESCRIPTION OF THE DRAWINGS

Additional advantages and features of the present invention will become apparent and fully understood from a reading of the following description, taken together with the annexed drawing, in which.

DESCRIPTION OF THE PREFERRED EMBODIMENT

Figure 1:
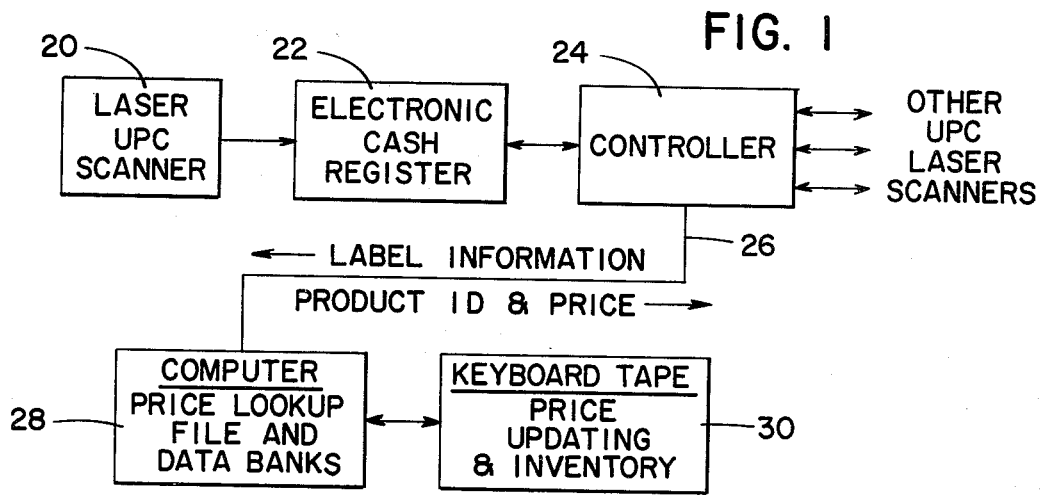
FIG. 1 is a block diagram of a merchandising check-out system in which the scanning apparatus of the present invention is incorporated.

Referring now to FIG. 1 of the drawings, there is shown a block diagram of a merchandise check-out system which includes a laser UPC scanner 20 coupled to an electronic cash register 22 which is on-line to a central controller 24 remotely located from the electronic cash register. As is well-known in the art, the controller 24 is coupled to a plurality of electronic cash registers for receiving data from subsystem 44 and a window 46 located in the check-out counter to a target area through which a merchandise item bearing UPC bar code indicia 32 passes. The bar code 32 may be printed on the merchandise item or on a label attached to the merchandise item. As is well-known in the art, the UPC bar code comprises a plurality of light and dark bars which, when scanned by the scanner apparatus, will generate a specific pulse waveform. The characteristics of this waveform are established by the width of the individual light and dark bars and by the speed of the sweep. The laser beam, upon scanning the bar code indicia, is reflected back from the bar code surface to an optical detector located in the optical subsystem 44. The signals are then transmitted to a signal detector and digitizer 48 which decodes the signals and transmits the decoded data to the microprocessor computer 50, which may be located in the scanner 20 or the controller 24 (FIG. 1). The controller 24 transmits the decoded data to the computer 28 for processing. The controller 24, upon receiving the product data back from the computer 28, will transmit the information to the electronic cash register 22 (FIG. 1) in a manner that is well-known in the art.

Figure 3:
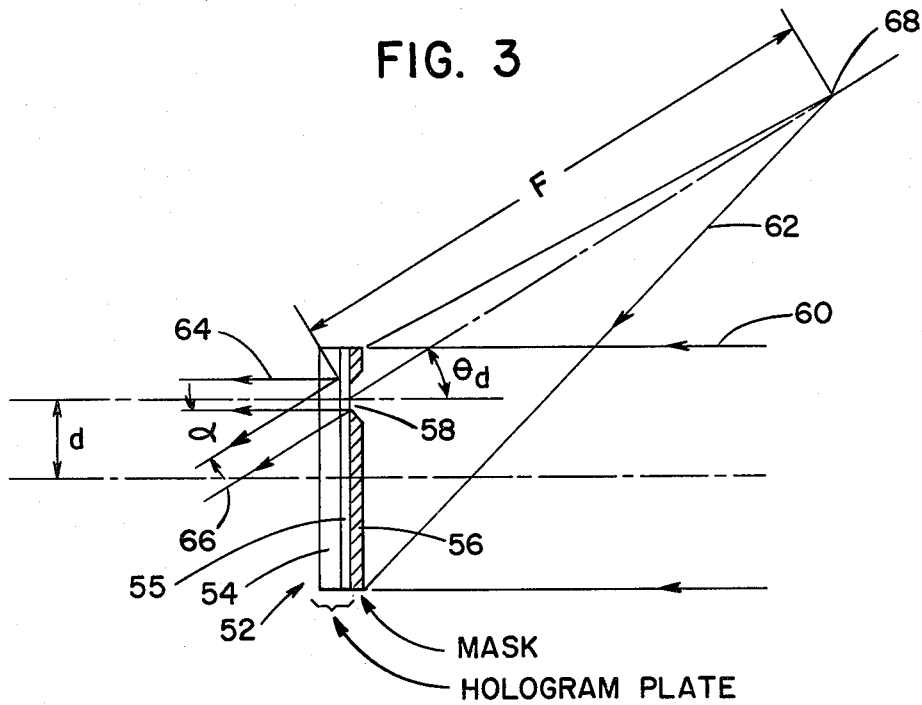
FIG. 3 is a schematic representation of a holographic plate showing the relationships of the laser beams as projected by the hologram.

Referring now to FIG. 3 of the drawings, there is shown a schematic representation of a holographic disk generally indicated by the numeral 52 and which is comprised of a hologram plate 54 consisting of a glass substrate and a layer 55 of sensitized recording material in which the hologram is recorded and on which is mounted a spatial filter copper mask 56. The recording material 55 may take the form of bleached photographic emulsions, dichromated gelatin, photopolymer, photoresist and thermoplastic. Because of the high diffraction efficiency and signal-to-noise ratio that can be achieved, dichromated gelatin was selected in the present embodiment. As is well-known in the art, a hologram is a recording of all the information in a wavefront of light obtained from an object which is illuminated with spatially-coherent monochromatic light, rather than an image of the object obtained in ordinary photography. The term "monochromatic" light, as used herein, means light composed substantially of a single wave length, while "spatially-coherent" light, as used herein, means light eminating actually or apparently from a point source. The hologram consists of the recording in the chemical recording layer 55 (FIG. 3) of the interference fringes in the wavefront covering a given area in a plane resulting from the interference between a first component of light obtained directly from a spatially-coherent monochromatic originating light source, which first component is directed to the given area in the plane at a predetermined angle with respect thereto, and a second component of light obtained from the object to be recorded which is illuminated by a light originating from the same light source simultaneously with the first component, which second component is directed at least in part to the given area in a plane at an angle $\theta_d$ (FIG. 3) other than the aforesaid predetermined angle.

These interference fringes result from the fact that the difference in path length and wave length, and hence the difference in phase, between the first or reference component of spatially-coherent monochromatic light and the second or information component of spatially-coherent monochromatic light varies from point to point. Therefore, constructive interference between the two components takes place at certain points, and destructive interference between the two components takes place at other points. Furthermore, the relative amplitude of the second or information component varies from point to point. This causes a variation in the contrast of the resulting interference fringes. In this manner, the recorded interference fringes form a pattern which defines both the amplitude and the phase of the second or information component as modulations in the contrast and spacing of the recorded interference fringes. This recorded pattern, which is called a hologram, contains all the information that can be carried by light waves transmitted through, reflected or scattered from an object.

A replica of the wavefront which comprises the second or information component may be constructed by illuminating a hologram with a source of spatially-coherent monochromatic light. In this case, the hologram diffracts light impinging thereon to form two sets of first order diffracted waves, each of which is a replica of the wave that issued from the original object. One of these two sets, when projected back to the illuminating source, produces a virtual image of the original object, while the other of these two sets produces a real image of the object through the use of a lens. The virtual image is in all respects like the original object, and if the original object was 3-dimensional, the reconstructed virtual image shows depth and gives rise to parallax effects between near and far objects in the scene in the same manner as did the original dimension object. The real image, however, is pseudo-scopic, that is, its curvature is reversed with respect to the original object, convex regions appearing to be concave, and vice-versa.

As shown in FIG. 3, the mask 56 mounted on the plate 54 includes a slit 58 for allowing only a certain portion of the light impinging on the mask 56 to be transmitted through the hologram on the plate 54. When projecting a collimated reference beam 60 onto the mask 56 together with a spatially-coherent monochromatic light beam 62, two sets, 64 and 66, of first-order diffracted waves are generated by the hologram on the plate 54 for use in reconstructing the original object. In the present embodiment, the diffracted waves 64 and 66 take the form of a single light beam which, depending on the construction of the hologram on the plate 54, will be projected at an angle $\alpha$ (FIG. 3) which angle may vary with each interference fringe located in the hologram resulting in the light beam traveling over a predetermined rectilinear path as determined by the angle $\alpha$ (FIG. 3). The slit 58 may be at any distance d from the center of the mask 56. The beam 62 appears to originate at a point 68 located at a focal distance F of the hologram on the plate 54.

Figure 4:
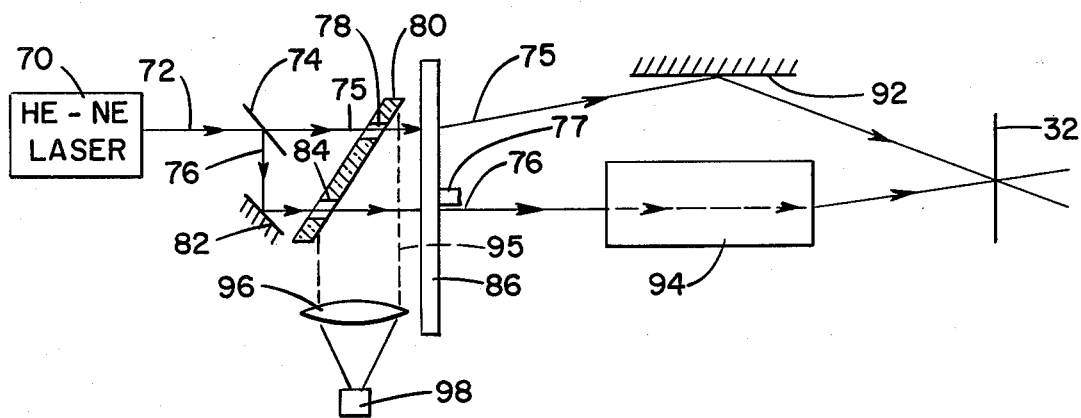
FIG. 4 is a schematic representation of a two beam scanning apparatus constructed in accordance with the present invention.
Figure 5:
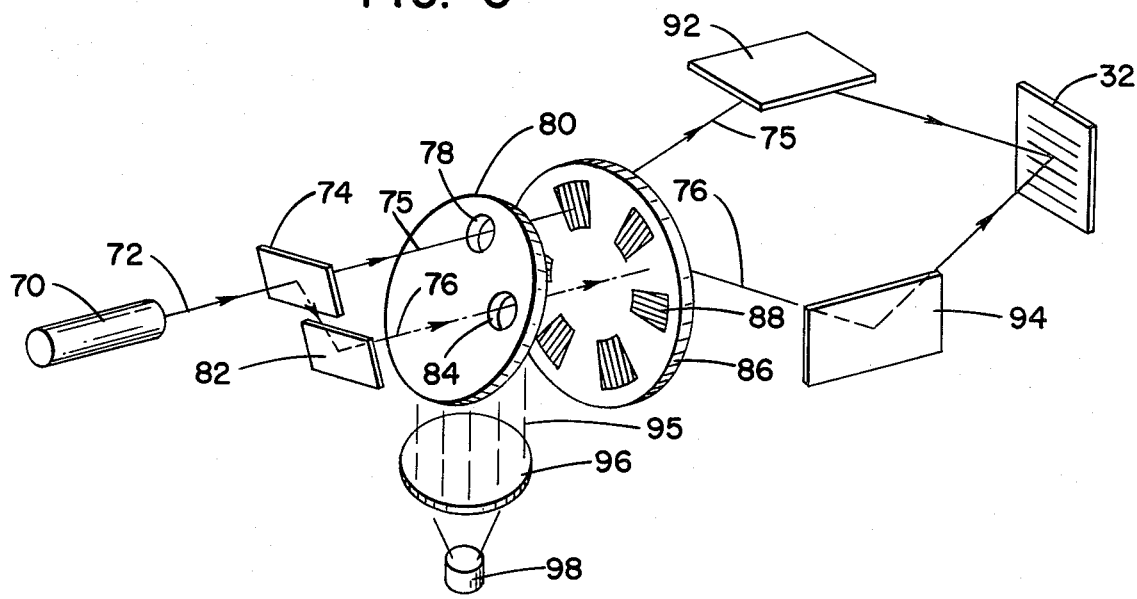
FIG. 5 is a perspective view of the scanning apparatus of FIG. 4.

Referring now to FIGS. 4 and 5, there is shown a schematic representation of a two-beam scanning apparatus constructed in accordance with the present invention. Included in such scanning apparatus is a helium-neon laser 70 which outputs a spatially-coherent monochromatic light beam 72. The light beam 72 is directed at a dichroic beam splitter 74 which will split the beam 72 into a horizontal light beam component 75 and a second component 76 which is at 90° to the path of the light beam component 75. The light beam component 75 will be transmitted through an aperture 78 located in a signal collecting mirror 80. The light beam component 76 is directed from the splitter 74 towards a 45° reflector mirror 82 from which it is directed towards a second aperture 84 located in the mirror 80. As shown more clearly in FIG. 5, the aperture 78 is located at the 12 o'clock position of the mirror 80 viewed looking forward, while the aperture 84 is located at the 3 o'clock position of the mirror 80.

Figure 6:
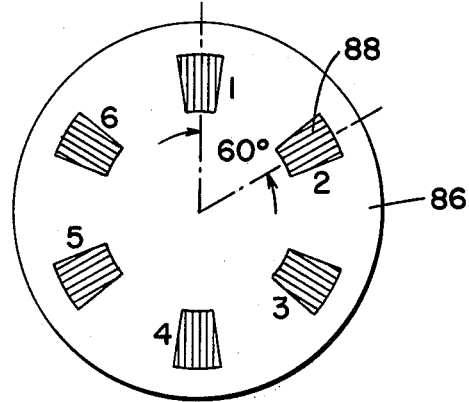
FIG. 6 is a plan view of the holographic disk incorporated in the scanning apparatus of FIG. 4 showing the mounting arrangement of the holograms.

Positioned adjacent the signal-collecting mirror 80 is a holographic disc 86 rotatable in a clockwise direction as viewed in FIG. 5 by shaft 77 and in which is mounted a plurality of holograms 88 (FIGS. 5 and 6). As shown in FIG. 6, each of the holograms 88 is offset by 60° with each adjacent hologram. The holograms 88 are formed in a manner that will be described more fully hereinafter in which a point source serves as the object beam, thus as the hologram is rotated, it will project a light beam along a rectilinear path. When the hologram 88 is in the 12 o'clock position, the light beam 75 impinging on the hologram results in a light beam being diffracted along a vertical orientated rectilinear path. When the same hologram is rotated clockwise 90° to the 3 o'clock position, the light beam 76 impinging on the same hologram 88 will be diffracted to sweep through a rectilinear path which is now in a horizontal plane. The apertures 78 and 84 prevent the light beam components 75 and 76 from being attenuated while properly orientating the beam components on the holographic disc 86.

Figure 7:
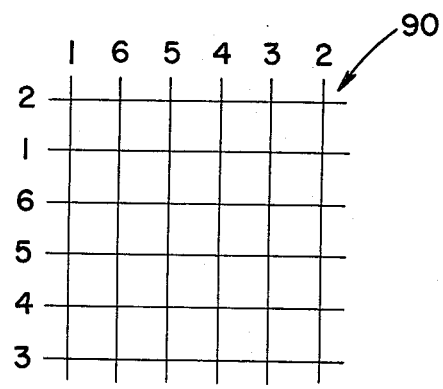
FIG. 7 is an illustration of the scan pattern generated by the scanning apparatus of FIG. 4.

FIG. 7 shows the scan pattern generated by the scanning system shown in FIGS. 4 and 5. It will be seen that each of the holograms 88 when impinged by the light beams 75 and 76 when in a 12 o'clock and 3 o'clock positions, respectively, will diffract the light beams 75 and 76 along a path which results in the scanning of the bar code label 32 (FIG. 5) in a grid pattern indicated generally as 90 in FIG. 7, with each line of the grid identified to a corresponding numbered hologram 88 in FIG. 6. Thus, the hologram 88 number 1 in FIG. 6 will diffract the light beams 75 and 76 resulting in the scanning of a light beam along the horizontal and vertical lines labeled 1 in FIG. 7.

Figure 2:
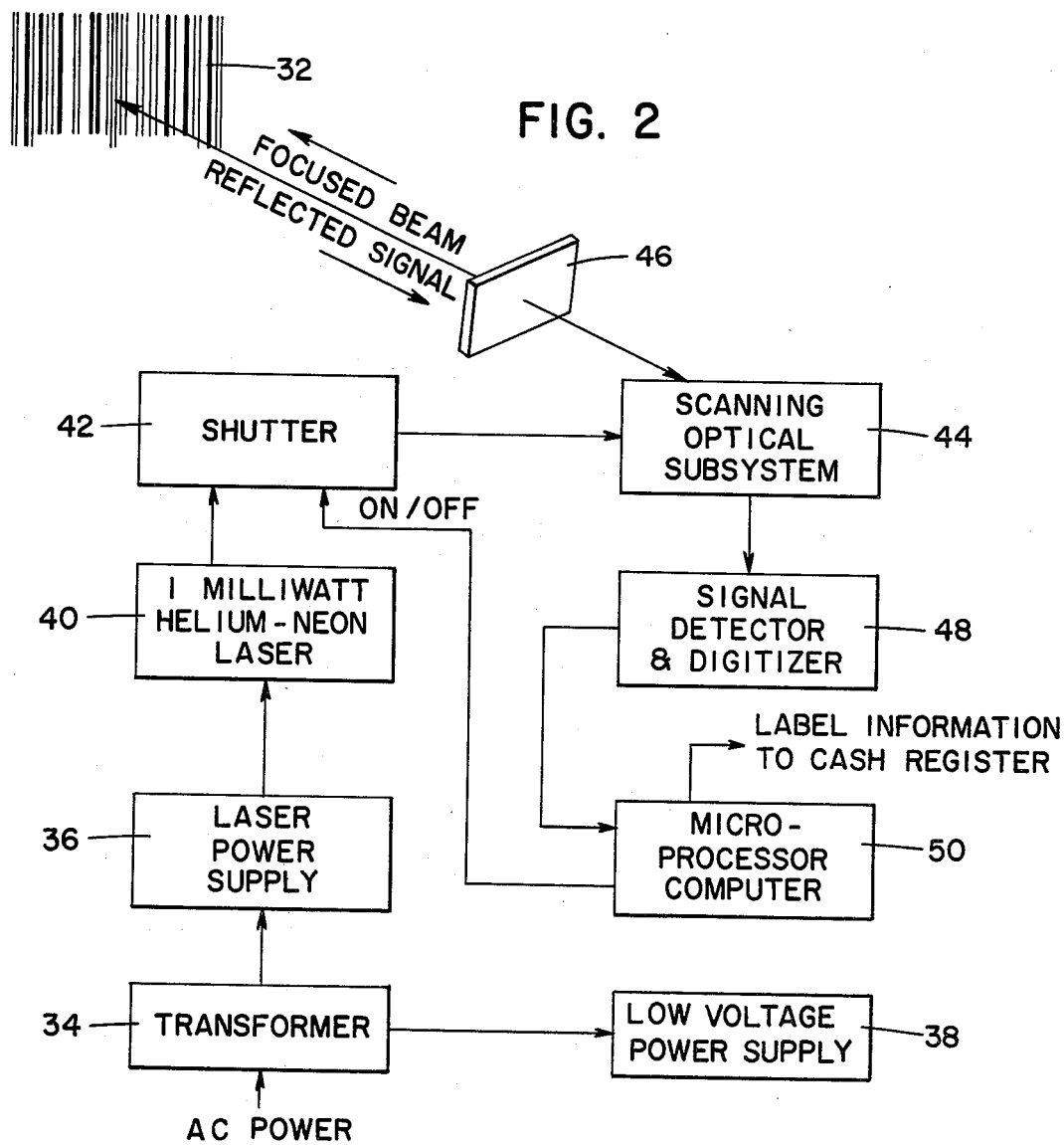
FIG. 2 is a block diagram of the system for reading the UPC bar code.

As shown in FIG. 5, each of the light beams 75 and 76 when diffracted by the hologram 88 will be deflected and redirected by mirrors 92 and 94, respectively, to the target area to form the grid pattern 90 (FIG. 7) through which a bar code printed on the label 32 will move. The light beams will be reflected from the bar code surface of the label 32 and being retrodirective will be deflected by the mirror 80 towards a collecting lens 96 in the form of diffused light signals 95, the lens 96 focusing the diffused light signals onto a solid state detector 98 which transmits the detected light signals in the form of electrical signals to the digitizer 48 (FIG. 2). The mirror 80 also acts as a spectral filter for the diffused light signals 95 for eliminating background noise such as room light. The digitizer 48 outputs the received electrical signals in the form of binary digits to the microprocessor computer 50 (FIG. 2). It will be seen from this construction that there will only be one beam spot scanning across the UPC symbol at any one instant, and therefore, the detector 98 will not be confused by multiple beam sources. Because of the single beam scanning, the system will provide a good signal-to-noise ratio and a high efficiency in collecting the returned signal. Furthermore, the two beams diffracted by each of the holograms 88 will scan orthogonally across the UPC label 32 which allows for better reading of the sides of a merchandise item where the UPC label 32 may be located.

Figure 8:
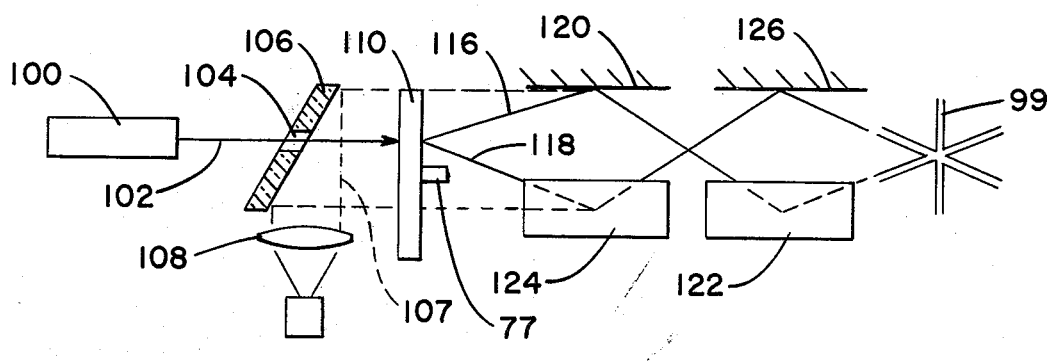
FIG. 8 is a schematic representation of a single beam scanning apparatus constructed in accordance with the present invention.
Figure 9:
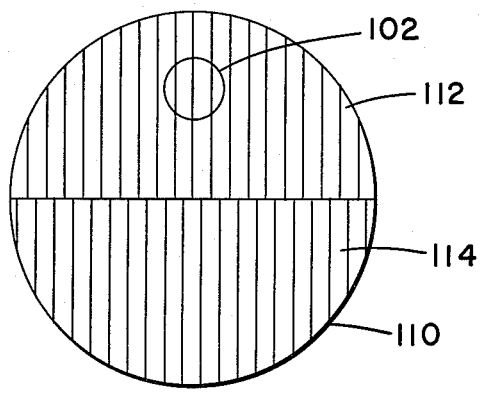
FIG. 9 is a plan view of the holographic disk incorporated in the scanning apparatus of FIG. 8.
Figure 10:
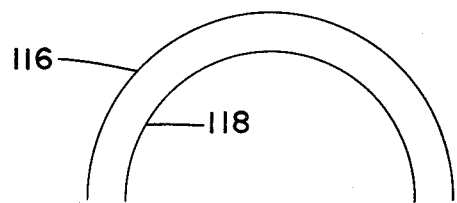
FIG. 10 is an illustration of the scan pattern generated by the holographic disk of FIG. 9.

Referring now to FIG. 8, there is shown a second embodiment of the present invention in which a single beam is used to produce an X scanning pattern 99 on the UPC label 32. Included in the system is a helium-neon laser 100 whose output beam 102 is transmitted through a single aperture 104 in a signal-collecting mirror 106 orientated to collect the reflected diffused light signals 107 from the UPC label 32 for transmission to a collecting lens 108. The light beam 102 is directed to a rotating holographic disk 110 which, as shown in FIG. 9, comprises an upper hologram 112 and a lower hologram 114. Each of the holograms 112 and 114 has interference fringe patterns which are offset one to the other. Impinging of the light beam 102 on the rotating disk 110 will result in the scan pattern shown in FIG. 10 which takes the form of two semicircular annular patterns 116 and 118, the pattern 116 being generated by the hologram 112 while pattern 118 is generated by hologram 114. The upper scan pattern 116 will be directed towards a reflecting mirror 120 (FIG. 8) and subsequently to a routing mirror 122 which redirects the scan pattern resulting in such pattern being projected as one segment of the X pattern 99 focused on the UPC label 32. The lower scan pattern 118 is directed towards a routing mirror 124 (FIG. 8) and the reflecting mirror 126 for focusing on the UPC label 32 in the form of another segment of the X scan pattern 99. The upper and lower holograms 112 and 114 are formed by exposing one half of the disc 110 first, then turning the disc 180° plus movement of ⅛ of an inch in a horizontal direction where the second exposure is made resulting in the offset holograms 112 and 114 as shown in FIG. 9.

Figure 11:
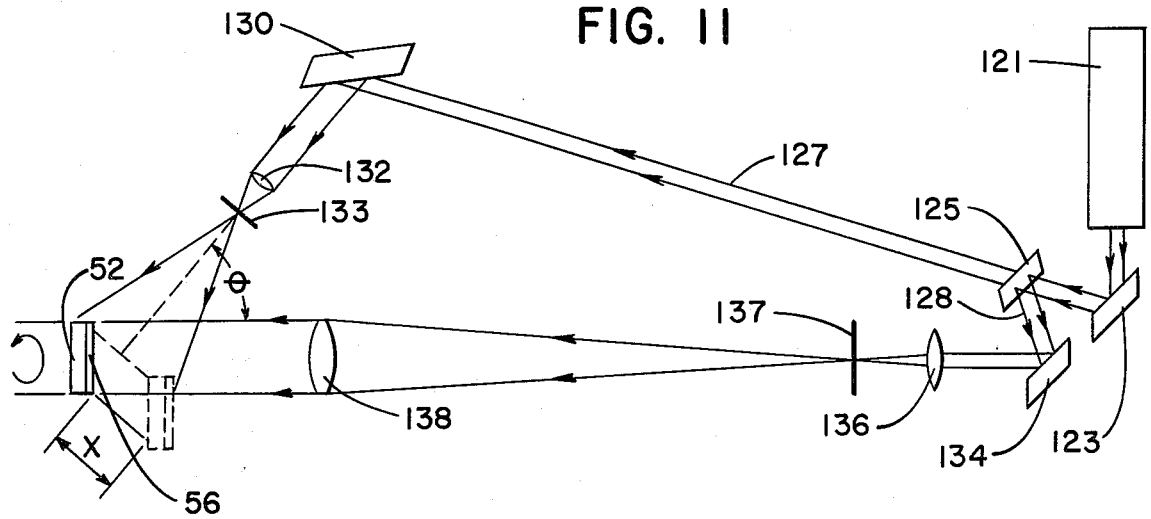
FIG. 11 is a schematic representation of the system for constructing the holographic disk of FIG. 6.

Referring to FIG. 11, there is shown a schematic representation of the system for constructing the holograms 88 mounted in the disk 86 shown in FIG. 6, whose construction is the same as the holographic disc 52 (FIG. 3). The output of a 50 milliwatt helium-neon laser 121 is directed towards a mirror 123 which deflects the light beam into a beam splitter 125 splitting the beam into two light beam segments 127 and 128. The beam segment 127 is directed towards the mirror 130 which deflects the beam segment through a spatial filter 132 which in turn directs the light beam through a pinhole spatial filter 133 for focusing on the mask 56 of the disk 52 (FIG. 3). The light beam segment 128 is directed to a mirror 134 which deflects the light beam segment through a spatial filter 136 which in turn directs the light beam segment through a pinhole spatial filter 137 towards a collimating lens 138 for directing the collimated light beam on the mask 56. The light beam segment 127, when focused on the mask 56, will function as the object beam, while the collimated light beam segment 128 transmitted through the lens 138 will function as the reference beam, thereby generating the interference fringes on the mask 56 which are exposed in the layer 55 (FIG. 3) of dichromated gelatin. After one exposure, the holographic disk 52 is rotated 15° and moved along a line that is perpendicular to the object beam 127 for the next exposure. In the present example, the disk 52 is moved 6.35 millimeters between each exposure. This movement is indicated by the dimension X in FIG. 11. This process is repeated until a hologram is formed with a series of interference fringes which will diffract a light beam along a rectilinear path over a predetermined distance. In this way, each of the holograms 88 (FIG. 6) is developed to generate the required grid pattern 90 (FIG. 7) for the scanning apparatus.

Figure 12:
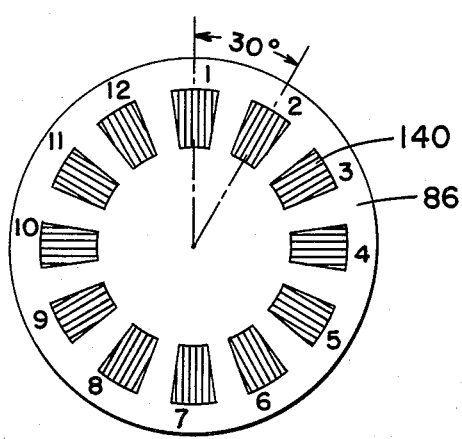
FIG. 12 is a plan view of a second embodiment of the holographic disk shown in FIG. 6 incorporated in the scanning apparatus of FIG. 4.
Figure 13:
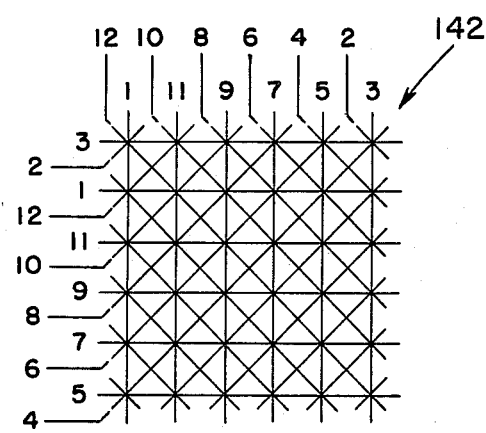
FIG. 13 is an illustration of the scan pattern generated by the scanning apparatus of FIG. 4 using the holographic disk of FIG. 12.

Referring to FIGS. 12 and 13, there is shown a second embodiment of the disc 86 (FIG. 6) in which twelve holograms 140 are circumferentially arranged on the disc 86 with each hologram offset to each other by 30°. The holograms 140 are constructed in the same manner as holograms 88 described previously except that holograms 2, 4, 6, 8, 10 and 12 project a light beam on a line 45° to the line of projection of holograms 1, 3, 5, 7, 9 and 11, thus producing the cross-hatch pattern 142 shown in FIG. 13. This type of pattern has the advantage of generating a number of scans of a UPC code irrespective of its orientation or the size of the code on the merchandise item or rotation or other type of off-line movement of the code as it moves through the scan area.

Although only certain preferred embodiments of the present invention have been described herein, it is not intended that the invention be restricted thereto, but that it be limited only by the true spirit and scope of the appended claims.

What is claimed is:

1. Apparatus for generating a multiple-line scan pattern in a code reader system comprising:
   a source of radiant energy beams;
   a plurality of holograms circumferentially mounted on a rotating support member, each hologram being an optical representation of a continuous line segment offset to the line of projection of each of the other of said holograms;

means for causing a plurality of parallel radiant energy beams to be directed at more than one location in the plane of the circumferentially mounted holograms wherein during rotation of the support member, each hologram will be orientated at a different angle when intersecting each parallel radiant energy beam to form a plurality of intersecting offset line segments;

means for directing said line segments onto a scan area in the form of a multi-line intersecting scan pattern through which passes an object to be scanned;

and means for detecting changes in the radiant energy reflected from the objects passing through said scan pattern.

2. The apparatus of claim 1 in which said source of radiant energy beams includes:

a source of radiant energy and means for splitting the radiant energy from said radiant energy source into first and second radiant energy beams which are directed at different locations in the plane of the circumferentially mounted holograms wherein each of said holograms will project the first of said radiant energy beams along a line segment which is offset to the line segments projected by the other of said plurality of holograms.

3. The apparatus of claim 2 in which said splitting means splits the second radiant energy beam at an angle to said first radiant energy beam, said apparatus further including optical means for directing said second radiant energy beam in a direction parallel to said first radiant energy beam and radially offset to said first radiant energy beam at an angle less than one hundred and eighty degrees.

4. The apparatus of claim 3 which further includes means for rotating said support member in a direction to rotate each of the holograms to a position intersecting the second radiant energy beam in which the hologram will be orientated to project the second radiant energy beam along the line segment which is at an angle with the line segment projected by the same hologram when positioned to intersect the first radiant energy beam.

5. The apparatus of claim 3 in which said angle is ninety degrees.

6. Apparatus for generating a multiple-line scan pattern in a bar code reader system comprising:

a laser beam source;

means for dividing the laser beam into first and second parallel offset light beams;

a rotating support member positioned to receive said light beams at two locations of a circumferential plane on said support member;

a first hologram located in the circumferential plane of said support member and adapted to intersect said first and second light beams upon rotation of said support member, said hologram orientated in a first direction to project a first line segment in a first direction when intersecting said first light beam and orientated in a second direction to project a second line segment in a second direction at an angle to said first line segment when intersecting said second light beam;

means for directing said first and second line segments to a scanning area in the form of a multi-line intersecting scan pattern through which passes an object to be scanned;

and means for detecting changes in the light reflected from the objects passing through said scan pattern.

7. The apparatus of claim 6 which further includes a second hologram located in the circumferential plane on said support member to intersect said first and second light beams for projecting line segments parallel to but offset from said first and second line segments projected by said first hologram.

8. The apparatus of claim 7 in which the scan pattern comprises a plurality of intersecting vertical and horizontal line segments forming a grid pattern at the scanning area.

9. The apparatus of claim 7 in which the scan pattern comprises a plurality of intersecting vertical, horizontal and diagonal line segments at the scanning area.

10. The apparatus of claim 6 in which the angle is ninety degrees.

11. The apparatus of claim 6 in which said dividing means includes:

a beam splitter for splitting the laser beam into a first light beam directed perpendicular to the circumferential plane on said rotating support member and a second light beam directed to the circumferential plane offset at an angle to said first light beam;

optical means positioned to direct said second light beam in a direction perpendicular to said support member but offset radiantly by an angle to said first light beam;

and a spatial filter positioned in the path of said first and second light beam for allowing said light beams to intersect on the holograms in said rotating support member but directing the reflected light from the objects passing through said scanning area to said detecting means.

12. A method for forming a pattern of intersecting lines at a scanning area for reading bar code indicia positioned therein comprising the steps of:

generating a pair of parallel light beams radially offset to each other at a predetermined angle;

moving a hologram through each of said light beams for deflecting each light beam to form a line segment of said pattern extending in a direction in accordance with the orientation of the hologram when deflecting said light beams;

and changing the orientation of the halogram when moving between said light beams to form a pair of intersecting line segments orientated at an angle one to the other in accordance with the orientation of the halogram.

13. A method for forming a pattern of intersecting lines at a scanning area for reading bar code indicia positioned therein comprising the steps of:

(a) generating a pair of parallel light beams radially offset to each other at a predetermined angle;

(b) moving a first hologram through each of said light beams for deflecting said light beams to form first and second intersecting line segments of said pattern extending in a direction in accordance with the orientation of said first hologram when moving through said light beams;

(c) moving a second hologram through each of said light beams for deflecting said light beams to form line segments parallel to but offset from said first and second line segments;

(d) changing the orientation of said first and second hologram when moving from said first light beam to said second light beam to form said first and second intersecting line segments at an angle with each other;

(e) and directing said first and second line segments to the scanning area in the form of a plurality of intersecting lines.

* * * * *